United States Patent [19]

Kubina

[11] 4,114,140
[45] Sep. 12, 1978

[54] VERIFICATION CHECKING SYSTEM

[75] Inventor: John Kubina, San Francisco, Calif.

[73] Assignee: Engineered Systems, Inc., Tempe, Ariz.

[21] Appl. No.: 789,960

[22] Filed: Apr. 25, 1977

[51] Int. Cl.² ........................... G06K 5/00; H04Q 3/02
[52] U.S. Cl. ............................ 340/149 A; 340/146.2; 235/380
[58] Field of Search ............ 340/149 A, 149 R, 146.2; 235/61.7 B

[56] References Cited

U.S. PATENT DOCUMENTS

| | | | |
|---|---|---|---|
| 3,794,813 | 2/1974 | Spetz | 340/149 A |
| 3,857,018 | 12/1974 | Stark et al. | 340/149 A |
| 3,866,173 | 2/1975 | Mooreman | 340/149 A |
| 3,959,633 | 5/1976 | Lawrence | 340/149 R |
| 3,961,160 | 6/1976 | Gorgens | 340/149 A |
| 4,048,475 | 9/1977 | Yoshida | 340/149 A |

Primary Examiner—Donald J. Yusko
Attorney, Agent, or Firm—Weiss and Ptak

[57] ABSTRACT

A system used to provide a verification check of a credit card or credit document includes a large capacity read/write memory having a single binary data bit stored at each address location. The credit card has unique identifying information encoded on it for addressing a specific location in the memory. A readout is provided in response to the insertion of the credit card to indicate whether the card is a valid one or not. To program the memory initially, a provision is made for individually addressing each of the different memory locations and to establish a "valid" or "non-valid" binary data bit storage at each location corresponding to a different credit card. In addition, manually operable addressing switches are provided to change the specific bit stored at any given address subsequent to the initial storage of data in the memory.

8 Claims, 5 Drawing Figures

VERIFICATION CHECKING SYSTEM

RELATED APPLICATIONS

The subject matter of this application is related to the systems disclosed in co-pending applications, Ser. No. 729,992 filed Oct. 6, 1976, and Ser. No. 745,218 filed Nov. 26, 1976, and can be used in conjunction with the systems disclosed in those applications.

BACKGROUND OF THE INVENTION

Automated and semi-automated product dispensing systems are becoming increasingly popular for dispensing products such as fuel for large fleet users or for private owners or for making banking transactions during hours when banks normally are closed. To permit use of these systems, generally a card reader control panel or control station is employed; and the transaction is initiated by insertion of an identified/credit card into a card reader by the customer or user of the system. These cards are uniquely encoded with indicia particularly identifying the customer or user and, in many cases, include other indicia to limit the type and quantity of product which may be purchased or withdrawn from the system in response to the use of the card.

Automated fuel dispensing systems exist which are operated in response to the insertion of uniquely encoded credit documents into a card reader. These systems then permit the withdrawal of particular types and quantities of fuel from fuel pumps controlled by the system and in addition, prepare the necessary billing information concerning the transaction for subsequent billing to the customer or card holder.

At least some of the data on the card in some such systems is then transmitted from the card reader to a remote or local computer for verification; and if the document is verified as an authorized document, the system permits the withdrawal of fuel under the control of the credit card. When a remote computer is used for the credit card verification, it is necessary for a committed transmission link to be employed between the location of the fuel pumps and the central computer location. This results in a relatively expensive system and limits the flexibility which is available at any given fuel dispensing site.

In the fuel dispensing systems of the above co-pending applications, a local control console is used to control a number of different dispensers without the necessity of verification of each transaction or a portion of each transaction by a central computer located remotely from the fuel dispensing site. The particular manner in which a credit card is checked to determine whether it is a valid card or a non-valid card can vary substantially. A most direct manner of verification is to uniquely encode a binary word (or words) on each card which identifies it and then to compare this word in a comparator against that same word stored in a memory where it is further identified as being either "valid" or "non-valid". Such an approach, however, requires a relatively large capacity memory, particularly if there are a large number of different credit cards in use in the system with which the local fuel dispenser is associated. A similar problem exists in conjunction with automatic bank tellers where a verification of the validity of the inserted credit document must be made prior to permitting a transaction to take place.

As a consequence, it is desirable to provide a system for checking the validity of a credit document quickly and easily at the location where the document itself is used and which further requires a minimum memory capacity in order to effect the necessary document check.

SUMMARY OF THE INVENTION

Accordingly, it is an object of this invention to provide an improved verification checking system.

It is another object of this invention to provide an improved credit card verification checking system using a minimum memory capacity.

It is an additional object of this invention to provide a simplified document verification system in which the document identifying indicia is uniquely encoded on the document and is used to address a single bit location in a memory storage uniquely associated with that particular credit document.

It is a further object of this invention to provide an improved credit document verification system for use with unattended business transaction system.

In accordance with the preferred embodiment of this invention, a verification checking system is used to verify uniquely encoded multi-bit binary words. The system includes a read/write memory which has a plurality of address locations in it; and each of these address locations store a single binary bit, either a binary "1" or binary "0". An address control circuit is operated in response to input signals to select a particular address location in the memory to write a bit into that address location or to read the bit from that address location. A read/write control circuit also is coupled to the memory for controlling its mode of operation, and manually settable switches are coupled to the address control circuit to supply input signals to it to either write new information into the memory or to check the status of a particular address location in the memory. In addition, a circuit is provided to receive the uniquely encoded multi-bit binary word to be verified and to cause the address control means to select the address in the memory corresponding to that work, whereupon the memory output is indicative of the verification check of the multi-bit binary word supplied to the system.

DETAILED DESCRIPTION

Figure 1:
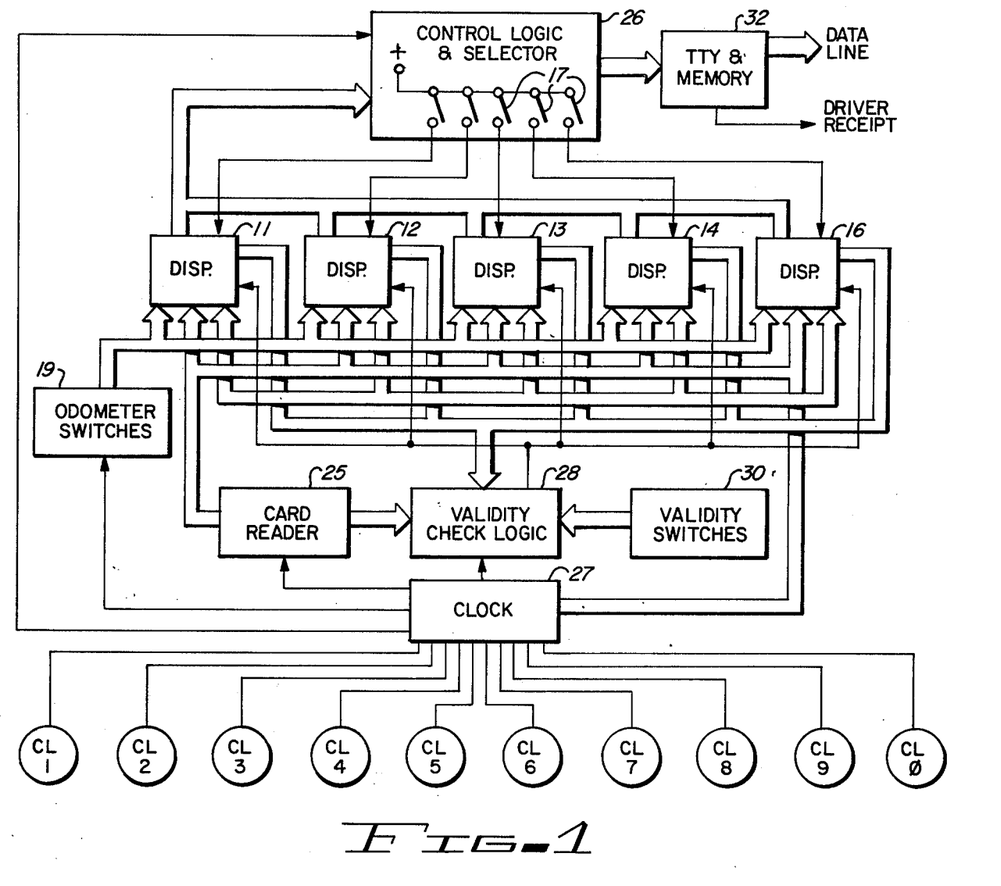
FIG. 1 is a block diagram of a typical system with which the preferred embodiment of this invention may be used.

The system shown in FIG. 1 is comparable to the system shown in FIG. 3 of applicant's above-identified co-pending application Ser. No. 729,992, and the disclosure of that application is incorporated herein by reference. As described in the co-pending Ser. No. 729,992 application, the system of that application is an automatic fuel dispensing system which may be used for unattended fuel dispensing terminals. To operate the system, a customer inserts an authorization credit card or credit document card into a card reader to control the dispensing of fuel from dispensers or pumps 11 through 14 and 16. For the details of the interface between the system and the customer using a credit document to initiate a transaction, reference should be made to the Ser. No. 729,992 application. The particular manner in which this interface is accomplished is not important to the present invention and for that reason is not discussed here in detail.

When a driver, customer or operator of the system desires to use the system, he inserts his credit/identification card into a card reader 25 which may be of a standard readily available commercial variety. For a fueling system as illustrated in FIG. 1, optional odometer entry data also may be desired. In such an event, the user of the system operates the odometer switches 19 to dial in an odometer reading prior to the dispenser selection. After insertion of a card in the card reader 25, the user selects the desired one of the dispensers 11 through 14 or 16 from which he wishes to withdraw fuel or other products by closing a switch 17 corresponding to the desired dispenser.

Figure 2:
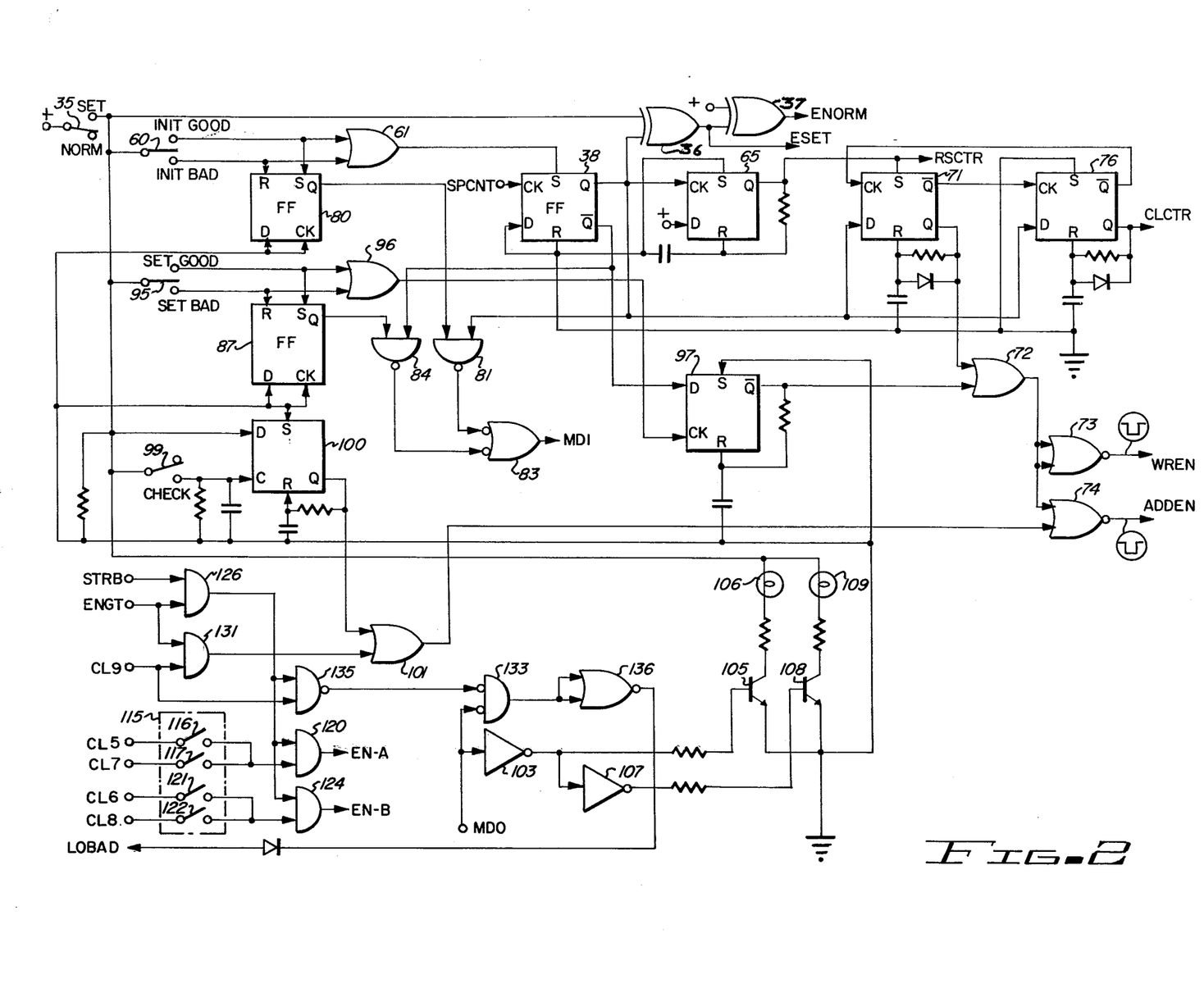
FIG. 2 through 5 are detailed block diagrams of a preferred embodiment of the system of the invention.
Figure 3:
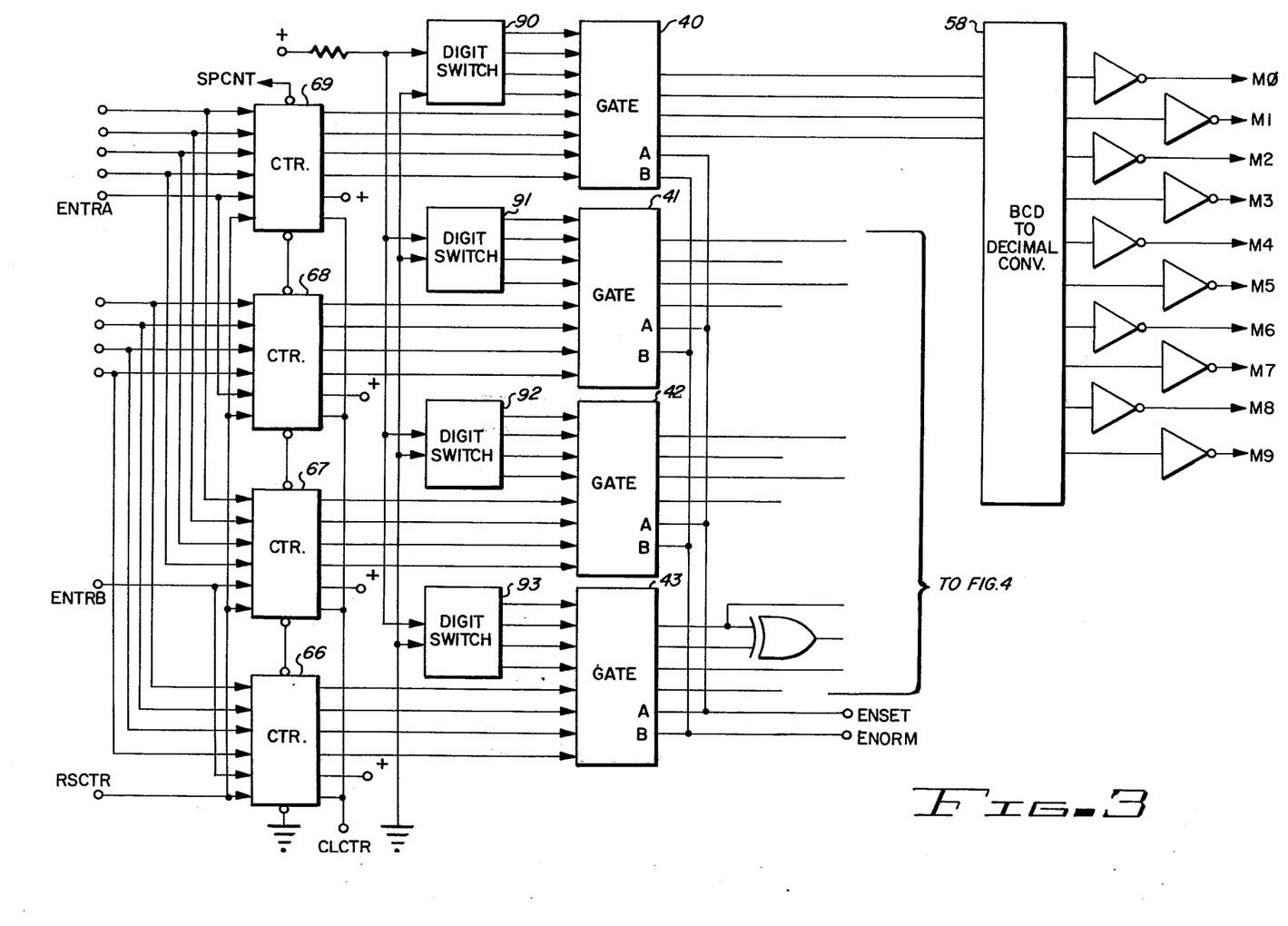
Figure 4:
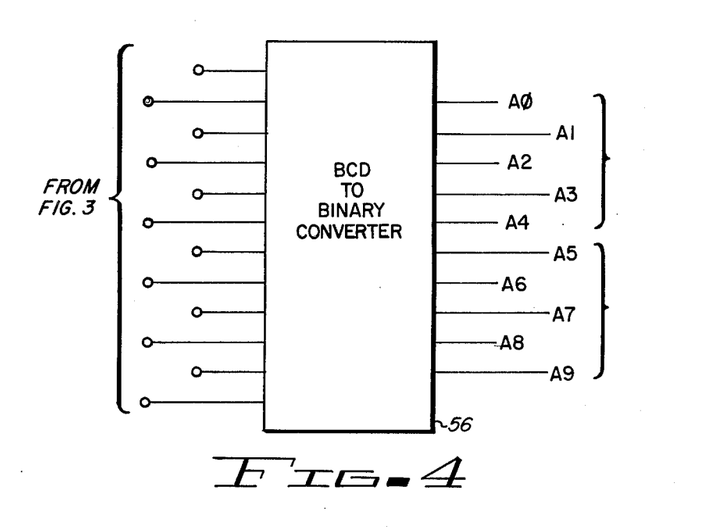
Figure 5:
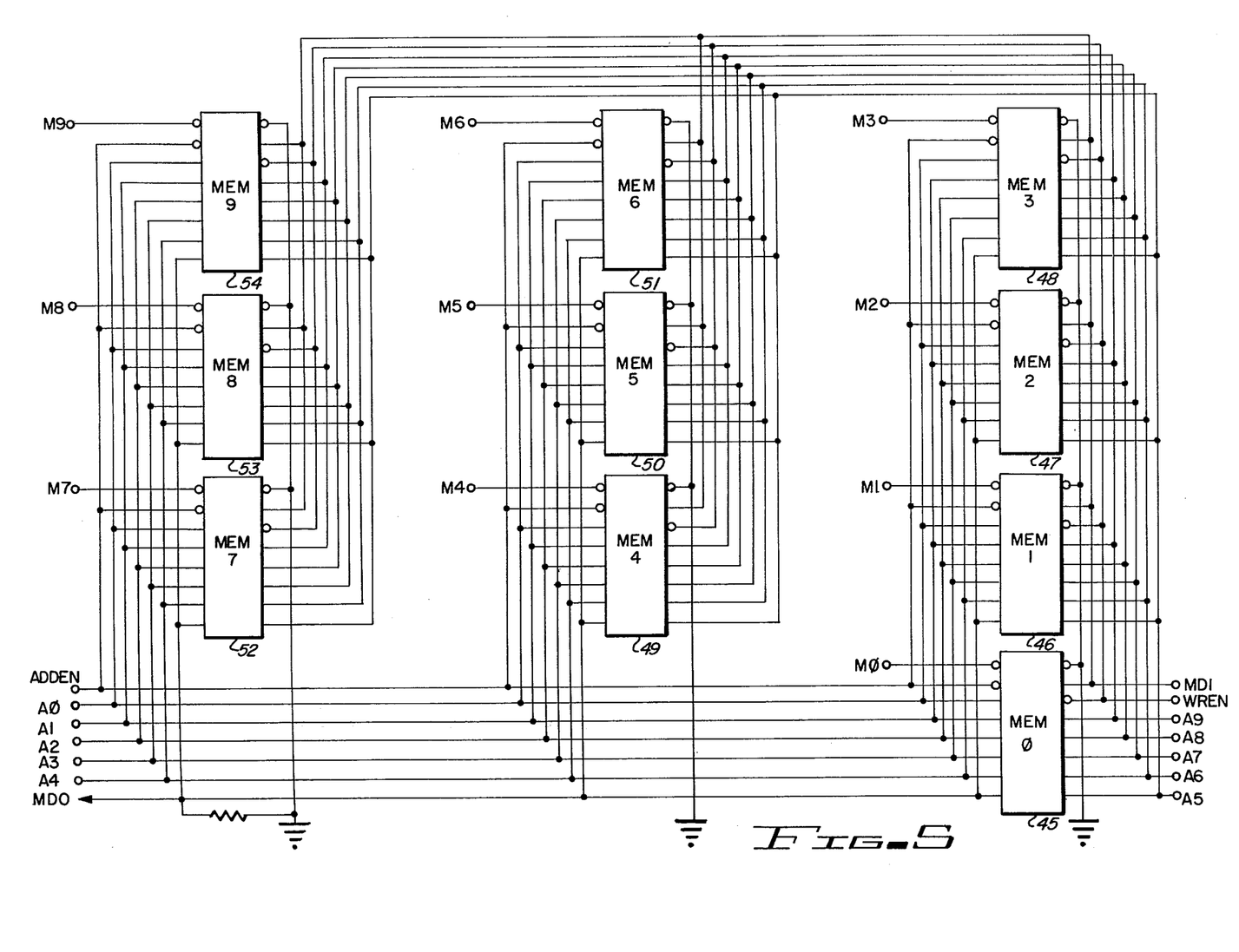

A clock timing pulse generator circuit 27 is employed to synchronize the operation of the entire system shown in FIG. 1 and the system shown in detail in FIGS. 3 through 5. This clock generator circuit produces sequences of clock pulses, C1 1 through C1 0, on different output leads to operate the various components of the system illustrated in FIGS. 1 through 5. These clock pulses and their timing sequence are the same as in the Ser. No. 729,992 application. These clock pulses operate the card reader 25 and a validity check logic circuit 28 for comparing the validity or security data on the card inserted into the reader 25 against security data established by the settings of validity switches 30 located in a region inaccessable to the user of the system. In addition, the card inserted into the reader 25 also may have encoded on it the particular type of fuel or fuels which the driver using the card is authorized to obtain. This encoded information is compared with data from the selected dispenser (or a logic circuit for that dispenser) and supplied to the logic circuit 28 for a further validity check. The manner in which this latter validity check is accomplished is described in detail in the co-pending Ser. No. 729,992 application.

If the inserted card passes all of the security and validity checks, an indicator light (not shown) associated with the selected dispenser illuminates to indicate that the selected dispenser is enabled for fueling. The card then may be removed from the reader, and the card reader 25 is ready for use with another card to start a new transaction which may take place simultaneously with the dispensing of fuel from the dispenser selected by the transaction initiated by the first card.

If for some reason the validity check of a card inserted into the reader 25 does not check out, an invalid indicator light (not shown) on the control panel of the system is illuminated; and the system cannot be operated to withdraw products from the selected dispenser since the validity check logic 28 provides an output to the selected dispenser to prevent it from being turned on by a non-valid card.

Once a transaction has been completed by the system, the control logic and selector circuitry 26 is operated to cause the forwarding of the transmission data, under control of the clock generator circuit 27, to a teletypewriter and buffer memory circuit 32. From this circuit, the completed transaction information may be supplied to an outgoing data line or computer terminal for further processing of the data.

Reference now should be made to FIGS. 2 through 5, which together comprise a block diagram of the portion of the validity check logic circuit 28 which may be used to identify and provide a validity check of each credit card inserted into the card reader 25 to initiate a transaction involving the withdrawal of fuel from one of the dispensers 11 through 14 or 16. This validity check logic circuit is used to prevent counterfeiters from being able to obtain fuel from the system by a once valid card or customer after a determination has been made that that card or customer no longer should be extended any further credit.

Often a customer may be authorized to withdraw fuel from a system but due to various circumstances may fall behind in maintaining payments on the transactions which he has made. A point then may be reached by the owner of the fuel dispensing system that no longer should any fuel be permitted to be withdrawn by by the delinquent customer or car holder. This can be accomplished simply by programming the system of FIGS. 2 through 5 to reject that particular card or that particular customer even through the cardholder or customer himself may still have possession of the card. This validity check is in addition to those which are described in detail in the above-mentioned co-pending applications and is used to supplement the systems of those applications.

FIG. 2 illustrates the control portion of the validity check logic circuit 28 of FIG. 1 and the circuitry used to establish the different modes of operation of the validity check logic circuit. The system operating mode primarily is controlled by a single-pole, double-throw switch 35 which is moved to its upper or "set" position for preparing the initial condition of operation of the memory associated with the validity check logic circuit 28 and for subsequently setting data into specific locations or addresses of the memory or for checking the status of the data stored at specific memory addresses.

When the switch 35 is in its lowermost position as shown in FIG. 2, this is the normal operating position for the system and is used to place the memories used in the verification circuit in a read only memory (R0M) mode of operation. This is accomplished by a pair of EXCLUSIVE OR gates 36 and 37 which are cascaded to the upper terminal of the switch 36. Gate 36 has one input connected directly to this upper terminal and the other input obtained from the "Q" output of a control flip-flop 38. Normally, this output is low, so that in the normal mode of operation, both inputs to the EXCLUSIVE OR gate 36 are low, causing its output also to be low. This results in a high output from the gate 37 and the outputs of the gates 36 and 37, labeled ENSET and ENORM thus are low and high respectively.

These outputs are applied to the "A" and "B" control inputs of four switch gates, 40, 41, 42 and 43 (FIG. 3) each of which functions as a four-pole, double-throw switch to alternatively interconnect either the upper four inputs of each of these switches with the four outputs thereof or the lower four inputs with the four outputs under control of the state of the outputs of the gates 36 and 37. Whenever a high or positive output appears on the ENORM input to these switch gates, the lower four inputs are connected with the respective outputs of the gates. Similarly whenever a high input is applied to the "A" inputs (ENSET) of these four gates, the upper four inputs to the gates are interconnected with their respective outputs. Thus, for the normal mode of operation of the system, the lower four inputs of the switch gates 40 to 43 are interconnected with their outputs.

Now assume that the system is first brought into operation, requiring an initial set of conditions to be established in the verification logic system to permit its programming for performing subsequent credit card verification checks. The switch 35 then is moved from its lowermost (NORM) operating position to its uppermost (SET) position (as shown in FIG. 2). This applies a positive potential to the upper input of the EXCLUSIVE OR gate 36 which initially reverses the condition of the outputs of the gates 36 and 37 from that described above.

To "initialize" or set up these beginning operating conditions, a bank of ten read/write memories 45 through 54 (FIG. 5) are programmed to store the same binary condition at each address location in the memory. Each of these memories 45 through 54 comprises a 1000 bit memory and each bit is separately and uniquely addressed by signals appearing on ten address leads, illustrated in FIG. 5 in two sets, A0 through A4 and A5 through A9, respectively. The signals on these address leads are supplied to the memory from a BCD to binary converter 56 (FIG. 4) which in turn is provided with input signals from the 12 output leads of the switch gates 41, 42 and 43. The outputs of the BCD to binary converter 56 are capable of 1000 different combinations to uniquely address each of the 1000 memory positions of each of the memories 45 through 54. Selection of the particular memory to respond to the addresses on the leads A0 through A9 is effected by the outputs of the switch gate 40 which are applied to a BCD to decimal converter circuit 58 (FIG. 3). The BCD to decimal converter circuit 58 has 10 outputs, supplied through buffer inverting amplifiers to provide a memory selection output on one of ten leads M0 through M9 at any given time in response to the outputs of the gate 40. Thus, the combination of the outputs of the BCD to binary converter 56 and the BCD to decimal converter 58 are capable of uniquely selecting any one of the 10,000 different address locations in the 10 1000 bit memory chips 45 through 54.

To initially set the system to store all "good" or all "bad" information in all of the memory locations in all of the memories 45 through 54, a spring loaded initializing switch 60 is moved from its normal unconnected central location to momentarily contact either its upper contact (initialize "good") or its lower contact (initialize "bad") to supply a momentary positive pulse over the selected lead. Whichever of these conditions is selected, a pulse is passed by an OR gate 61 to trigger the set input of the flip-flop 38 to cuase its "Q" output to go high. This then causes the condition of the outputs of the EXCLUSIVE OR gates 36 and 37 to be low and high, respectively, which is the same condition of operation as exists for normal operation of the system, as described previously.

The normal output condition of the flip-flop 38 is for its "Q" output to be low; so that when this output goes high a clock pulse is applied to the clock input of a one-shot multivibrator 65 to trigger it to its astable condition of operation. This causes a short duration positive pulse to appear on the "Q" output of the multivibrator 65, and this pulse is applied to the reset counter input, RSCTR, of a jam input counter comprising four, fourstage cascaded digital counters 66, 67, 68 and 69 (FIG. 3) to set all of these counters to their 0 count or zero state of operation. In other words, the initial pulse from the output of the one-shot multivibrator 65 is used to clear the counters 66 to 69. These counters normally are operated in a serial mode (jam inputs disabled) since the jam enabling inputs ENTRA and ENTRB are at a "low" potential.

This same pulse is applied to the set input of another one-shot multivibrator 71 to trigger it to its astable condition of operation. This causes a short duration positive-going pulse to be applied through an OR gate 72 to a pari of NOR gates 73 and 74. At the same time, the $\overline{Q}$ output of the multivibrator 71 switches from its normally high output to a momentary low output pulse. At the end of the time out period of the multivibrator 71, the $\overline{Q}$ output goies high to trigger a cascaded one-shot multivibrator 76 into its astable condition of operation. The $\overline{Q}$ output of the multivibrator 76 is connected to the clock input of the multivibrator 71 and together they function as a free running pair of multivibrators once the initial trigger pulse has been applied to the multivibrator 71 from the multivibrator 65.

Each time the multivibrator 76 is triggered into its astable state of operation, a high output pulse of short duration appears on the "Q" output of the multivibrator. This comprises the clock pulse (CLCTR) to the counter, and this pulse is applied to all of the counters 66 through 69 to operate these counters as a conventional BCD counter, with the counter 66 comprising the input stage since its signal input terminal is permanently grounded. Thus the counters 66 through 69 operate to count the 10,000 pulses, corresponding to the 10,000 addresses for the memory units 45 through 54. The outputs of the counters 66 through 69 are applied to the switch gates 40 through 43 and are coupled to the outputs of these gates since the output of the EXCLUSIVE OR gate 37 is high at this time and the output of the gate 36 is low.

As described previously, the outputs of the switch gate 40 are applied to the BCD to decimal converter 58 to select one of the ten memories 45 through 54 to respond to signals on the address leads. The outputs of the gates 41 through 43 are applied to the twelve inputs of the BCD to binary converter circuit 56 (FIG. 4) which in turn produces the unique combinations of outputs necessary to select any one of the 1,000 different addresses or address locations in each of the memories 45 through 54.

The sequence of operation of the multivibrators 71 and 76, which together constitute a free running multivibrator system, is to first apply an output pulse from the multivibrator 76 to the CLCTR counter advance input terminal of the counters 66 through 69. When this pulse terminates, the multivibrator 71 is set to its astable condition and the pulse passed by the OR gate 72 is applied through both of the NOR gates 73 and 74 to the memories 45 through 54. The output of the NOR gate 73 is a short duration negative going pulse which enables the "write" input (WREN) of the memories 45 through 54. Data can only be written into the memories 45 through 54 when this pulse is present, otherwise the memories operate strictly as read only memories. At the same time, the address enable (ADDEN) for permitting the reading of data out of or the writing of data into the memories 45 through 54 is obtained in the form of a negative going pulse from the output of the NOR gate 74. The outer input to the NOR gate 74 is normally low, so that its output also is low at the time the positive pulse is obtained from the output of the OR gate 72.

A particular memory then is selected for addressing and for writing of data into it when the WREN output of the NOR gate 73 is low and the ADDEN output of the NOR gate 74 is low, simultaneously with a low output obtained from the selected inverted output of the BCD to decimal converter 58 to select one of the ten memory units 45 through 54. Only the selected one of the memory units is permitted to respond to the writing of data into the address selected by the binary address signals on the leads A0 through A9 at any given time. These addresses are changed sequentially by the stepping of the counters 66 through 69 under the control of the clock pulses CLCTR appearing at the output of the multivibrator 76.

The particular data which is written into the addressed location of the selected one of the memories 45 through 54 at each different step or cycle of operation of the multivibrator set 71/76 is established by the particular direction of operation of the switch 60. If the switch 60 is initially operated to its upper contact (initially "good"), a flip-flop 80 is direct set to cause its "Q" output to go high. This output is applied to one of two inputs of a NAND gate 81, the other input which is obtained from the "Q" output of the flip-flop 38. As described previously, the "Q" output of the flip-flop 38 also is high at this time. This means that the output of the NAND gate 81 goes low and this output is applied to one of two inputs of a NOR gate 83. The other input of the NOR gate 83 is obtained from the output of a NAND gate 84, which has one input obtained from the "Q" output of a flip-flop 87 and the other input obtained from the $\overline{Q}$ output of the flip-flop 38. Since the $\overline{Q}$ output of the flip-flop 38 is low at this time, the output of the NAND gate 84 is high, irrespective of the condition of the output of the flip-flop 87. Thus, the NOR gate 83 has one low input applied to it and one high input applied to it. As a consequence, its output is "high", indicative of a binary "1" on the output terminal MDI of the gate 83. This constitutes the data input signal (shown on the right-hand side of FIG. 5) applied in common to the data input terminals of all of the memory units 45 through 54. Thus when the write pulse WREN appears on the output of the NOR gate 73, this binary "1" is written into the selected address location in the selected memory unit.

If, on the other hand, the initializing switch 60 was initially switched to contact its lower contact (initial "bad"), the flip-flop 80 is set to its reset condition, providing a low output on its "Q" output terminal. Under this condition of operation the output of the NAND gate 81 goes high, so that both inputs to the NOR gate 83 are high. The output of the NOR gate 83 then goes low, representing a memory data input (MDI) for a binary "0". This then would constitute the data stored in the selected address locations of the memory units 45 through 54, so long as the system remains in this initializing mode of operation.

The selected data, either binary "1" (good) or binary "0" (bad) is written into each of the address locations of the memory under the control of the system which steps the counters 66 through 69. When 10,000 counts representative of the 10,000 addresses for the memories 45 through 54 have been reached, an output is obtained from the last counter stage 69 on an output terminal and constitutes final count (SPCNT) from the counter 69. This output is applied to the clock input of the flip-flop 38 and this causes the flip-flop 38 to be reset to its initial state of operation. Thus the "Q" output goes low and the $\overline{Q}$ output goes high. This in turn removes the enabling inputs to the oneshot multivibrators 71 and 76; so that the operation of the free running multivibrator 71/76 is terminated. Thus, no longer are any write enable (WREN) pulses applied to the memories from the output of the NOR gate 73, and no longer is the address enable (ADDEN) control of the memories effected by the output of the OR gate 72 through the NOR gate 74.

Once the initial clearing of the memories 45 to 54 which has been described above has been effected, individual ones of the memory address locations can be changed to store indicia opposite that which has been initially set into the memory for the purpose of utilizing the system as a verification check system. For example, if all of the memory address locations were initially set to store a binary "1" (good) this means that uniquely encoded verification data on the credit cards used in the system is assumed to be "good". If it is desired to prevent the use of any particular credit card in the system, it is necessary to change the binary "1" stored at the address location corresponding to that card to binary "0". To do this, the switch 35 once again is placed in its upper or "set" position as shown in FIG. 2. The initializing switch 60 however, is not operated; so that the outputs of the EXCLUSIVE OR gates 36 and 37 are reversed from the conditions described previously. That is, the output of the gate 36 is high and the output of the gate 37 is low. This causes the switching gates 40 through 43 to be operated to connect the upper four inputs of each of these gates with their respective outputs. Thus, the outputs of the counters 66 through 69 no longer control the address selection of the memories. Once this has been done, four sets of manually operated thumbwheel digit switches 99 through 93 then can be set to the uniquely encoded BCD word corresponding to the selected credit card (either individual card or customer identification) which is to be prevented from functioning to operate the system with which the verification logic of FIGS. 2 through 5 is associated.

The outputs of the switches 90 through 93 may uniquely identify any one of the 10,000 different addresses of the memory units 45 through 54. These outputs are applied through the switch gates 40 to 43 to select a particular address corresponding to the desired card which is to be locked out of the system. If the system previously had all of the memory location set "good", that is storing a binary "1", a spring loaded switch 95 is momentarily moved to its lower position to produce a positive pulse through an OR gate 96 to the clock input of a one-shot multivibrator 97.

This same pulse is applied to the reset terminal of a flip-flop 87 to cause its "Q" output to go low, if this output already was not low. Since the flip-flop 38 is already in its reset condition of operation (with its "Q" output low) the result of this operation is to cause the NOR gate 83 to go low. This means that the memory data input signal (MDI) is representative of a binary "0" or "bad" indicia for the selected address. The pulse produced by the one-shot multivibrator 97 is applied through the OR gate 72 in the same manner described previously to cause the writing of the data information appearing on the terminal MDI into the selected address of the memory. At the termination of the pulse from the one-shot multivibrator 97, no further operation of the circuit takes place until the switch 95 is again pulsed to either of its two terminals.

In the event that the initializing data storage in all of the memory units 45 through 54 was to cause them to store binary "0", the system can be inidividually operated to store a binary "1" in each selected address location as manually established by the digit switches 90 through 93 by momentarily actuating the switch 95 to its upper contact. This merely would reverse the output of the NOR gate 83 to a high or binary "1" output from that described above by a reversal of the state of the flip-flop 87. The operation of the one-shot multivibrator 97 is the same. Thus, for each different address location, a different setting of the digit switches 90 through 93 can be made to change or store the desired data at that address location in the manner described above.

If it is desired merely to check the condition of an address location without writing new data into the memory, the switch 95 is not operated, but the switch 35 is again moved to its upper "set" position as shown in FIG. 2. The condition of the switch gates 40 through 43 then remains as described above for the setting of information from the digit switches 90 through 93 into the memory. Instead of operating the switch 95, however, a check switch 99 is moved from its normally unconnected position, as shown in FIG. 2, to its lowermost position. This then triggers a one-shot multivibrator 100 into operation to produce a pulse through an OR gate 101 to the lower input of the NOR gate 74. Since the upper input of this NOR gate is low at this time, the positive going pulse supplied to the lower input produces a short duration negative pulse on the output of the NOR gate 74. The output of the NOR gate 73, however, remains high at this time; so that the address location which has been selected by the setting of the switches 90 through 93 may be used to produce a readout on the common output terminal MDO from the memory units. This output then is representative of the data stored at that address location in the memories 45 through 54, effectively causing the system to be operated as an ROM memory system (read only memory).

Data read out of the memory is applied through a first inverter 103 to the base of an NPN transistor 105 connected in series with an indicator lamp 106 between the switch 35 and ground. The output of the inverter 103 is supplied through a second inverter 107 to the base of a second NPN transistor 108 which in turn is connected in series circuit with a second indicator lamp 109 and ground. Thus, one or the other of the lamps 106 or 109 is illuminated depending upon whether a binary "1" or a binary "0" was stored at the selected address location in the memory. Typically, the lamp 106 is a red lamp indicative of "bad" (invalid) status and the lamp 109 is a green lamp indicative of "good" (valid) status of the selected address. This provides the user of the system with a ready visual reference of the status of the address selected by him on the digit switches 90 through 93.

Assume now that the system has initially been set up and that some selected address locations of the memory units 45 through 54 have been set to store a binary digit respresentative of a "bad" credit card which is to be locked out of the system or prevented from using the system to obtain products or services in response to use of the card. As described previously, the normal operation of the system other than the initializing operation or the setting of the memory for specific address locations or checking of specific address locations by way of the switches 90 through 93, is for the switch 35 to be placed in its lowermost position. In this position, the various other circuit switches of FIG. 2 which have been described above are rendered inoperative. Particularly, no writing of data into the memory can be obtained from the output of the NOR gate 73 since its output continues to be high at all times when the switch 35 is in its lowermost or "NORM" position. In the normal condition of operation of the system, the addressing of the memory is effected through the counters 66 through 69 which now are operated as jam input counters. With the switch 35 in its lowermost position, the output of the EXCLUSIVE OR gate 37 is high and that of the EXCLUSIVE OR gate 36 is low, so that the switch gates 40 through 43 are enabled to supply the information connected to the lowermost four leads of each of these gates to the outputs of the gates. This means that the counters are in control and the digit switches 90 through 93 are prevented from having any effect on the operation of the system.

As described in detail in the specification of co-pending application Ser. No. 729,992, various types of data are encoded on the cards inserted into the card reader 25. Some columns of this data include the unique information used to identify the vehicle and/or customer. This is the information which is checked in the verification circuit of FIGS. 2 through 5 to determine whether that card is one which is valid for use in the system, that is, whether that particular card can be used to obtain products from the system controlled by the verification logic and the circuitry shown in FIG. 1. This data is checked during clock pulses 5, 6, 7 and 8, and these clock pulses are used in the circuit shown in FIG. 2 occur at the same time as the corresponding clock pulses to which reference is made in co-pending application Ser. No. 729,992. The eight rows of data in any column of the card inserted into the reader are applied in two groups of four to the jam input counters 66 through 69. For example, rows 1 through 4 are connected in parallel to the inputs of the counters 67 and 69, while rows 5 through 8 are connected in parallel to the inputs of the counters 66 and 68. To provide additional security and additional flexibility in the programming of the system, the data on these rows is alternately read simultaneously into the counters 68 and 69 and simultaneously at a different time into the counters 66 and 67. Thus, two different columns of data, each comprising eight rows of binary information is stored in the counters 67 through 69 to select the one of the 10,000 address locations in the memories 45 through 54 which corresponds to the data read from the cards.

To control which of the columns on the cards are used to enter this data, a manually operated preset switch bank 115 is provided. This switch bank includes a first pair of switches 116 and 117 connected to one input of an AND gate 120. A second pair of switches 121 and 122 are connected to one input of a second AND gate 124. The other inputs to the gates 120 and 124 are obtained in common from the output of an AND gate 126 which is provided with two inputs, the STRB and the ENGT inputs which correspond to the similarly identified inputs of the system disclosed in the co-pending Ser. No. 729,992 application. All that is necessary for the purposes of this disclosure is that the output of the gate 126 is high at the time that the clock pulses CL5, CL6, CL7 and CL8 occur. Only one of the two stitches 116 or 117 is closed and only one of the two stitches 121 or 122 is closed to control the particular time of occurrence of the clock pulse which is applied to each of the gates 120 and 124. These clock pulses are applied to read different columns of information from the card reader; so that by grouping the pulses in this manner, different groups of data may be used for verification purposes. In addition, the arrangement of closure of the switch combinations 116/117 and 121/122 can be varied at any time the programming for the system is to be changed.

The counters 66 and 67 are enabled to respond to the data appearing on their inputs as jam input data whenever a positive output (EN-B) is obtained from the AND gate 124. Similarly, the counters 68 and 69 are enabled to store, as jam input counters, the data appearing on the inputs supplied to them whenever a positive output (EN-A) is obtained from the gate 120. The sequence of operation of the clock pulses in conjunction with the input signals appearing on the two parallel groups of leads coupled to the inputs of the counters corresponding to the card inserted into the system.

At the time the subsequent ninth clock pulse, CL9, occurs, it is applied to one input of an AND gate 131 which is enabled on its other input from the ENGT signal of the system in FIG. 1. This produces a positive output through the OR gate 101 which is applied to the NOR gate 74 to create a negative going address enable pulse to the memories 45 through 54. This permits the memories to be read for the selected address to produce an output signal on the output lead MDO corresponding to the "good" or "bad" binary bit indicia which is stored at that address. This binary output signal from the memories is applied to the lower one of two inputs to a negative logic NAND gate 133, the upper input to which is obtained from the output of a positive logic NAND gate 135. Whenever a clock pulse CL9 appears, the upper input to the NAND gate 133 goes low, and this gate is used to sample the data on the common output MDO from the memories. The output of the NAND gate 133 then is passed through an inverter 136 to constitute the output signal to the rest of the system to signify whether the validity check logic found the card being checked to be "good" or "bad" (valid or invalid). If the card is "bad", the MDO signal is used by the system to prevent operation of the system to withdraw products. If the card checks out "good", normal use of the system is permitted.

Any "good" card can subsequently be locked out of the system by encoding its identifying BCD word (words) on the switches 90 to 93 and operating the system in its "set" mode via switches 35 and 95 to change the stored binary bit for that card in the memories 45 to 54 from "good" (binary "1") to "bad" (binary "0"). Similarly the bit stored for a locked out or "bad" card can be changed back to "good" whenever the credit status for that card changes.

The system is very flexible and uses only a single bit of storage in the memory for each card or customer using the system.

I claim:

1. A system for providing a verification check of uniquely encoded multi-bit binary words including in combination:

read/write memory means having a plurality of address locations therein, each address location storing a single binary bit;

address control means operated in response to addressing signals and coupled to said memory means for selecting a particular address location in said memory means for writing data into and reading data from said particular address location;

read/write control means coupled to said memory means for controlling the mode of operation of said memory means;

gating circuit means having a plurality of inputs and having outputs coupled with said address control means for supplying said addressing signals thereto;

settable switch means coupled to selected inputs of said gating circuit means for supplying input signals thereto;

circuit means coupled to others of the inputs of said gating circuit means for supplying input signals thereto; and selecting means coupled to said gating circuit means for causing the signals appearing on the outputs of said gating circuit means to be selected from the input signals from said settable switch means or the input signals from said circuit means.

2. The combination according to claim 1 wherein said gate means comprises a multiple-pole, double-throw switching circuit means.

3. The combination according to claim 1 wherein said memory means has a single output and produces an output signal thereon corresponding to the binary bit stored at the address location selected therein by the addressing signals on the outputs of said gating circuit means.

4. The combination according to claim 1 further including initializing circuit means coupled with said read/write control means and said address control means for initially causing said memory means to store binary bits of the same type in all of said plurality of address locations.

5. The combination according to claim 4 wherein said system further includes "set" control means coupled with said read/write control means and said selecting means for causing said memory to be placed in its "write" mode of operation and for causing said gate means to supply addressing signals to said address control means from said settable switch means; and means for causing binary bits having a predetermined binary characteristic to be stored in said memory means at the selected address locations.

6. The combination according to claim 5 wherein said selecting means further includes means for causing said memory means to operate as a read-only memory means when said selecting means causes said gating circuit means to provide addressing signals on the outputs thereof in response to input signals applied thereto from said circuit means.

7. The combination according to claim 6 further including a source of clock pulses, and wherein said circuit means includes a jam input counter, the outputs of which are coupled to said others of the inputs of said gating circuit means and the inputs to which are coupled with a source of uniquely encoded multi-bit binary words; and wherein said initializing circuit means causes said counter to be reset to a predetermined initial count and to be operated as a binary pulse counter in response to clock pulses from said clock circuit means until the number of clock pulses counted thereby is at least equal to the number of memory locations in said memory means.

8. The combination according to claim 7 wherein said settable switch means comprise digital switches capable of being encoded to produce multi-bit binary words having the same number of bits therein as said uniquely encoded multi-bit binary words.

* * * * *